(12) United States Patent
Nachmany et al.

(10) Patent No.: US 11,886,683 B1
(45) Date of Patent: Jan. 30, 2024

(54) DIGITAL PROCESSING SYSTEMS AND METHODS FOR PRESENTING BOARD GRAPHICS

(71) Applicant: Monday.com LTD., Tel Aviv (IL)

(72) Inventors: Ron Nachmany, Tel Aviv (IL); Tom Bogin, Tel Aviv (IL)

(73) Assignee: MONDAY.COM LTD, Tel Aviv (IL)

( * ) Notice: Subject to any disclaimer, the term of this patent is extended or adjusted under 35 U.S.C. 154(b) by 0 days.

(21) Appl. No.: 18/148,730

(22) Filed: Dec. 30, 2022

(51) Int. Cl.
*G06F 3/04815* (2022.01)
*G06F 9/451* (2018.01)
*G06F 3/0485* (2022.01)

(52) U.S. Cl.
CPC ........ *G06F 3/04815* (2013.01); *G06F 3/0485* (2013.01); *G06F 9/451* (2018.02)

(58) Field of Classification Search
CPC ..... G06F 3/04815; G06F 3/0485; G06F 9/451
See application file for complete search history.

(56) References Cited

U.S. PATENT DOCUMENTS

| | | | |
|---|---|---|---|
| 4,972,314 A | 11/1990 | Getzinger et al. | |
| 5,220,657 A | 6/1993 | Bly et al. | |
| 5,479,602 A | 12/1995 | Baecker et al. | |
| 5,517,663 A | 5/1996 | Kahn | |
| 5,632,009 A | 5/1997 | Rao et al. | |
| 5,682,469 A | 10/1997 | Linnett et al. | |
| 5,696,702 A | 12/1997 | Skinner et al. | |
| 5,726,701 A | 3/1998 | Needham | |
| 5,787,411 A | 7/1998 | Groff et al. | |
| 5,880,742 A | 3/1999 | Rao et al. | |
| 5,933,145 A | 8/1999 | Meek | |
| 6,016,438 A | 1/2000 | Wakayama | |
| 6,016,553 A | 1/2000 | Schneider et al. | |
| 6,023,695 A | 2/2000 | Osborn et al. | |

(Continued)

FOREIGN PATENT DOCUMENTS

| CA | 2828011 A1 | 9/2012 |
|---|---|---|
| CN | 103064833 A | 4/2013 |

(Continued)

OTHER PUBLICATIONS

D'Elessio et al., Monday.com Walkthrough 2018\All Features, Platforms & Thoughts, Mar. 1, 2018, pp. 1-55, 2018.

(Continued)

*Primary Examiner* — Andrey Belousov
(74) *Attorney, Agent, or Firm* — Finnegan, Henderson, Farabow, Garrett & Dunner LLP

(57) ABSTRACT

Systems, methods, and computer-readable media for presenting board graphics are disclosed. The systems and methods may involve receiving a request to present, on a display, a board having a plurality of document object models (DOMs) arranged in rows and columns. A canvas layer of the board may be generated, including a graphical representation of each of the plurality of DOMs. A library of locations on the canvas layer may be generated, storing an arrangement of the plurality of DOMs. Disclosed embodiments may present, on the display, a portion of the canvas layer, where the presented portion of the canvas layer is be determined by a size of the display. The graphical representation of each of the plurality of DOMs presented on the display may be transformed into a corresponding DOM of the plurality of DOMs.

22 Claims, 9 Drawing Sheets

(56) References Cited

U.S. PATENT DOCUMENTS

| | | |
|---|---|---|
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | McComb et al. |
| 6,167,405 A | 12/2000 | Rosensteel, Jr. et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |

(56) References Cited

U.S. PATENT DOCUMENTS

| | | |
|---|---|---|
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 | 3/2020 | Kulkarni et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,086,894 B1 | 8/2021 | Srivastava et al. |
| 11,222,167 B2 | 1/2022 | Gehrmann et al. |
| 11,243,688 B1 | 2/2022 | Remy et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |

(56) References Cited

U.S. PATENT DOCUMENTS

| | | |
|---|---|---|
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |

(56) References Cited

U.S. PATENT DOCUMENTS

| | | |
|---|---|---|
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0310126 A1* | 10/2015 | Steiner ............... G06F 16/9574 |
| | | 715/204 |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | Lore et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |

(56) References Cited

U.S. PATENT DOCUMENTS

| | | |
|---|---|---|
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0301039 A1 | 10/2017 | Dyer et al. |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0012342 A1 | 1/2019 | Cohn |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0179501 A1 | 6/2019 | Seeley et al. |
| 2019/0208623 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |

(56) References Cited

U.S. PATENT DOCUMENTS

| | | |
|---|---|---|
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2022/0221591 A1 | 7/2022 | Smith et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3443466 B1 | 12/2021 |
| KR | 20150100760 | 9/2015 |
| WO | WO 2004100015 A2 | 11/2004 |
| WO | WO 2006116580 A2 | 11/2006 |
| WO | WO 2008109541 A1 | 9/2008 |
| WO | WO 2017202159 A1 | 11/2017 |
| WO | WO 2020187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/1B2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/1B2020/000024, dated May 3, 2021 (13 pages).

"Pivot table—Wikipedia"; URL: https://en.wikipedia.org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/1B2021/000297, dated Oct. 12, 2021 (20 pages).

Dapulse.com "features".extracted from web.archive.or/web/20140918421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Anlysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.

Pederson et al., "Tivoli: an electronic whiteboard for informal workgroup meetings", Conference on Human Factors in Computing Systems: Proceedings of the Interact '93 and CHI '93 conference on Human factors in computing systems; Apr. 24-29, 1993:391-398. (Year 1993).

Kollmann, Franz, "Realizing Fine-Granular Read and Write Rights on Tree Structured Documents." in the Second International Conference on Availability, Reliability and Security (ARES'07), pp. 517-523. IEEE, 2007. (Year: 2007).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Peltier, "Clustered and Stacked Column and Bar Charts", Aug. 2011, Peltier Technical Services, Inc., pp. 1-128; (Year: 2011).

Beate List, "An Evaluation of Conceptual Business Process Modelling Languages", 2006, SAC'06, Apr. 23-27, pp. 1532-1539 (Year: 2006).

"Demonstracion en espanol de Monday.com", published Feb. 20, 2019. https://www.youtube.com/watch?v=z0qydTgof1A (Year: 2019).

Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).

Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).

Gutwin, C. et al., "Supporting Informal Collaboration in Shared-Workspace Groupware", J. Univers. Comput. Sci., 14(9), 1411-1434 (2008).

Barai, S., et al., "Image Annotation System Using Visual and Textual Features", In: Proceedings of the 16th International Conference on Distributed Multi-media Systems, pp. 289-296 (2010).

B. Ionescu, C. Gadea, B. Solomon, M. Trifan, D. Ionescu and V. Stoicu-Tivadar, "Achat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).

\* cited by examiner

DIGITAL PROCESSING SYSTEMS AND METHODS FOR PRESENTING BOARD GRAPHICS

TECHNICAL FIELD

The present disclosure relates to systems, methods, and computer readable media for presenting board graphics. For example, disclosed embodiments may be configured to present or render board graphics at a desired frame rate upon loading a board or during scrolling of a board.

BACKGROUND

A frame rate is the speed at which a graphical user interface (GUI) such as a Web page, application interface, a browser, a document, or other file can graphically render—or recalculate, lay out, and paint—content to a display. Most displays, such as screens, have a refresh rate of 60 frames per second (FPS). If the frame rate of a GUI is less than the refresh rate of the screen the GUI is being displayed on, such as less than 60 FPS, the user experience while loading the GUI and while scrolling through the GUI may decrease due to "stickiness." Scrolling "stickiness" refers to when the GUI does not load in an adequate duration of time and a blank screen, or any other display that does not correspond with the contents of the Web page, is shown.

Thus, to optimize the user's experience with a seamless display of graphics, a Web page, website, or computer graphic is to have a frame rate that matches or exceeds the refresh rate of the screen it is to be displayed on. Therefore, code or script associated with a Web page should run and load the contents of the Web page within a duration of time that matches the refresh rate of the screen or any other display, such as, for example, 16.66 milliseconds (ms) for a screen with a refresh rate of 60 FPS.

GUIs that are rich in data and information to be displayed are more vulnerable to "stickiness" while scrolling, due to lowered frame rates resulting from the large quantities of data to be rendered. For example, data boards and tables that provide significant amounts of information and graphics may experience significant lag and stickiness while scrolling through a large board. Improved systems and techniques for presenting such graphics are desirable.

SUMMARY

Embodiments consistent with the present disclosure provide systems, methods, and computer readable media generally related to presenting board graphics. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executed by at least one processing device and perform any of the steps and/or methods described herein.

Consistent with disclosed embodiments, systems, methods, and computer readable media for presenting board graphics are disclosed. The embodiments may include at least one processor. The at least one processor may be configured to receive a request to present, on a display, a board having a plurality of document object models (DOMs) arranged in rows and columns. The at least one processor may also generate a canvas layer of the board. The canvas layer of the board may include a graphical representation of each of the plurality of DOMs. Additionally, the at least one processor may generate a library of locations on the canvas layer, and the library of locations may store an arrangement of the plurality of DOMs. The at least one processor may present, on the display, a portion of the canvas layer. The presented portion of the canvas layer may be determined by a size of the display. Furthermore, the at least one processor may transform the graphical representation of each of the plurality of DOMs presented on the display into a corresponding DOM of the plurality of DOMs.

BRIEF DESCRIPTION OF THE DRAWINGS

FIG. 7 illustrates a flowchart for presenting board graphics, consistent with disclosed embodiments.

DETAILED DESCRIPTION

Figure 1:
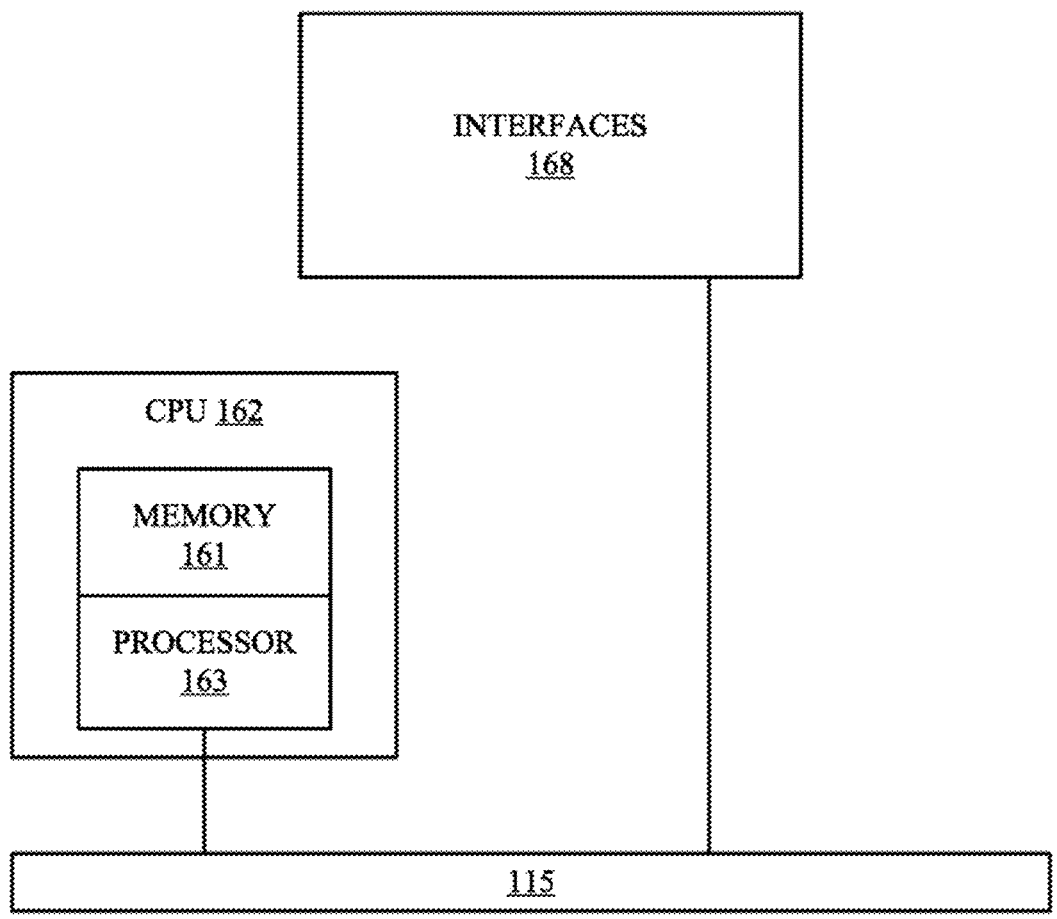
FIG. 1 is a block diagram of an exemplary computing device which may be employed in connection with disclosed embodiments.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storageAccordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a performing operations, consistent with some embodiments. In some embodiments, computing device 100 may be similar in type and function to user device 220, discussed with respect to FIG. 2. As shown in FIG. 1, the computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 100 may include one or more input and output devices (not shown in figure). Computing device 100 may also include a display 150, such as a touchscreen display or other display types discussed herein.

Figure 2A:
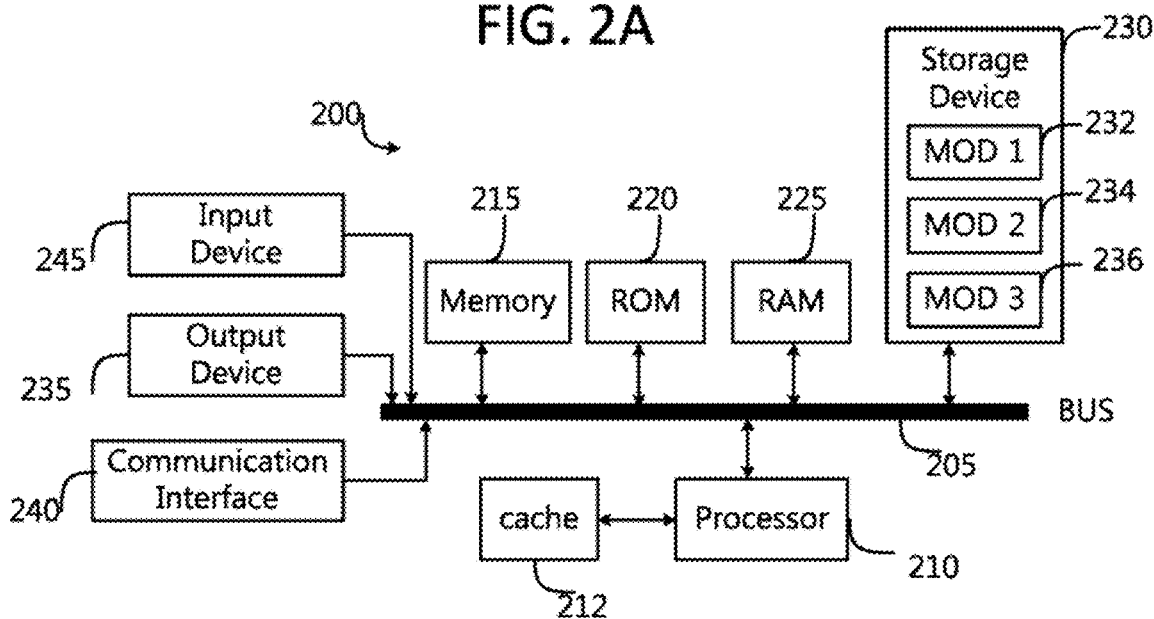
FIG. 2 is a block diagram of an exemplary computing architecture for collaborative work systems, consistent with disclosed embodiments.
Figure 2B:
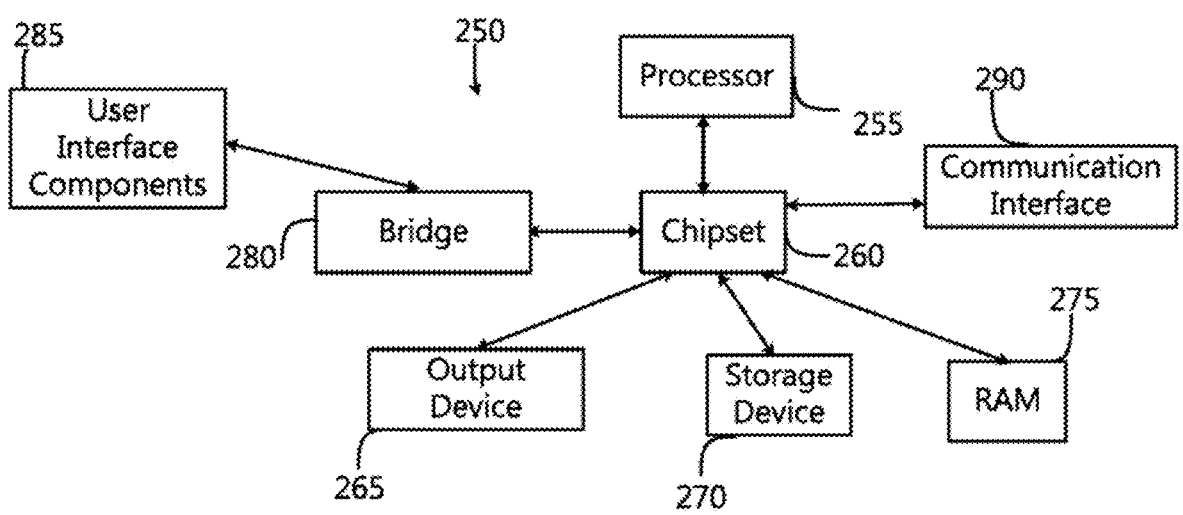

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
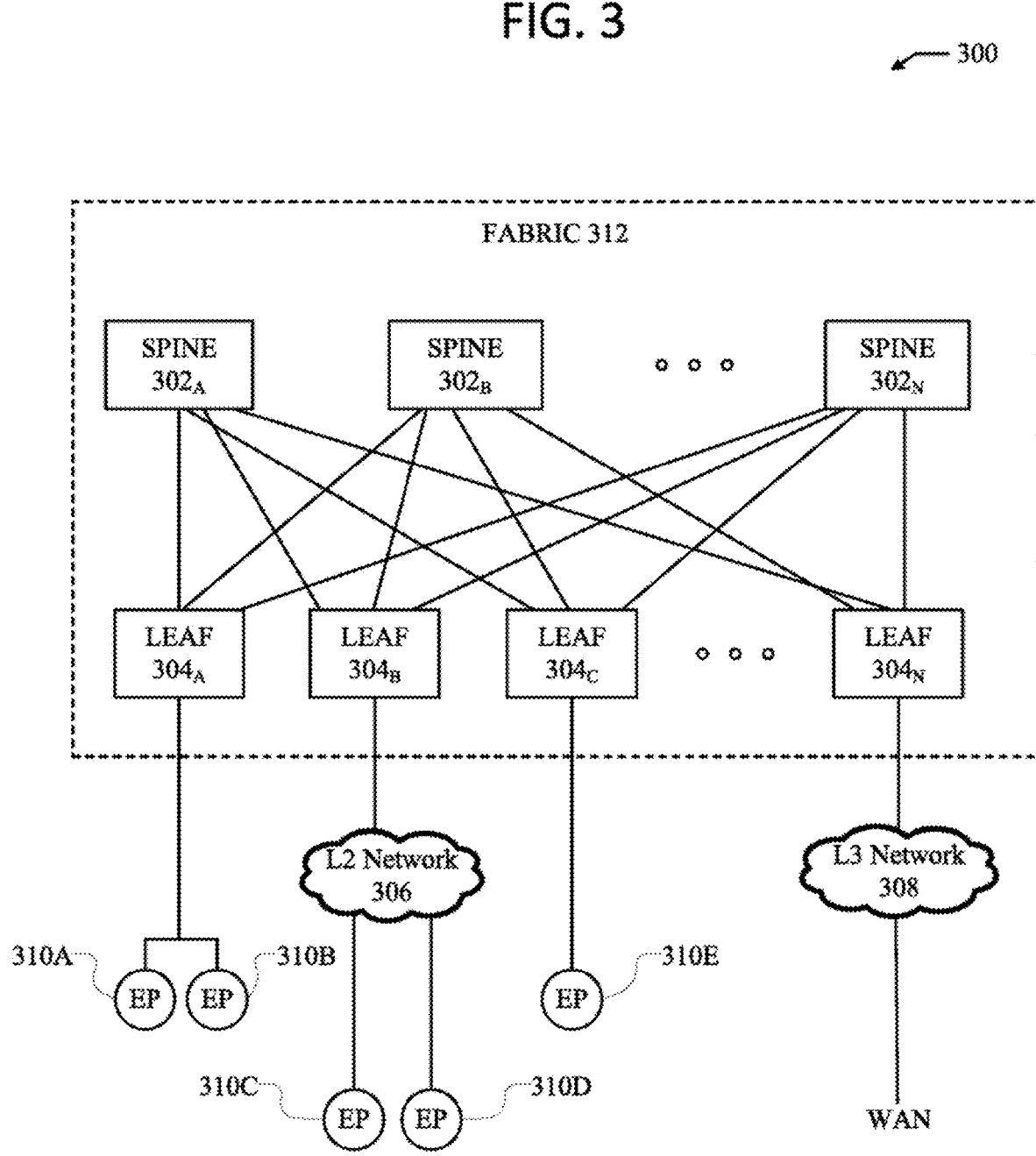
FIG. 3 illustrates an example of an electronic collaborative word processing document, consistent with disclosed embodiments.

FIG. 3 is an exemplary embodiment of a presentation of an electronic collaborative word processing document 301 via an editing interface or editor 300. In some embodiments, electronic collaborative word processing document 301 may be a board. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

In some embodiments, electronic word processing document 301 may include a plurality of document object models (DOMs). Additionally, electronic word processing document 301 may be presented partially or in its entirety using a canvas layer, according to embodiments of the present disclosure.

Figure 4:
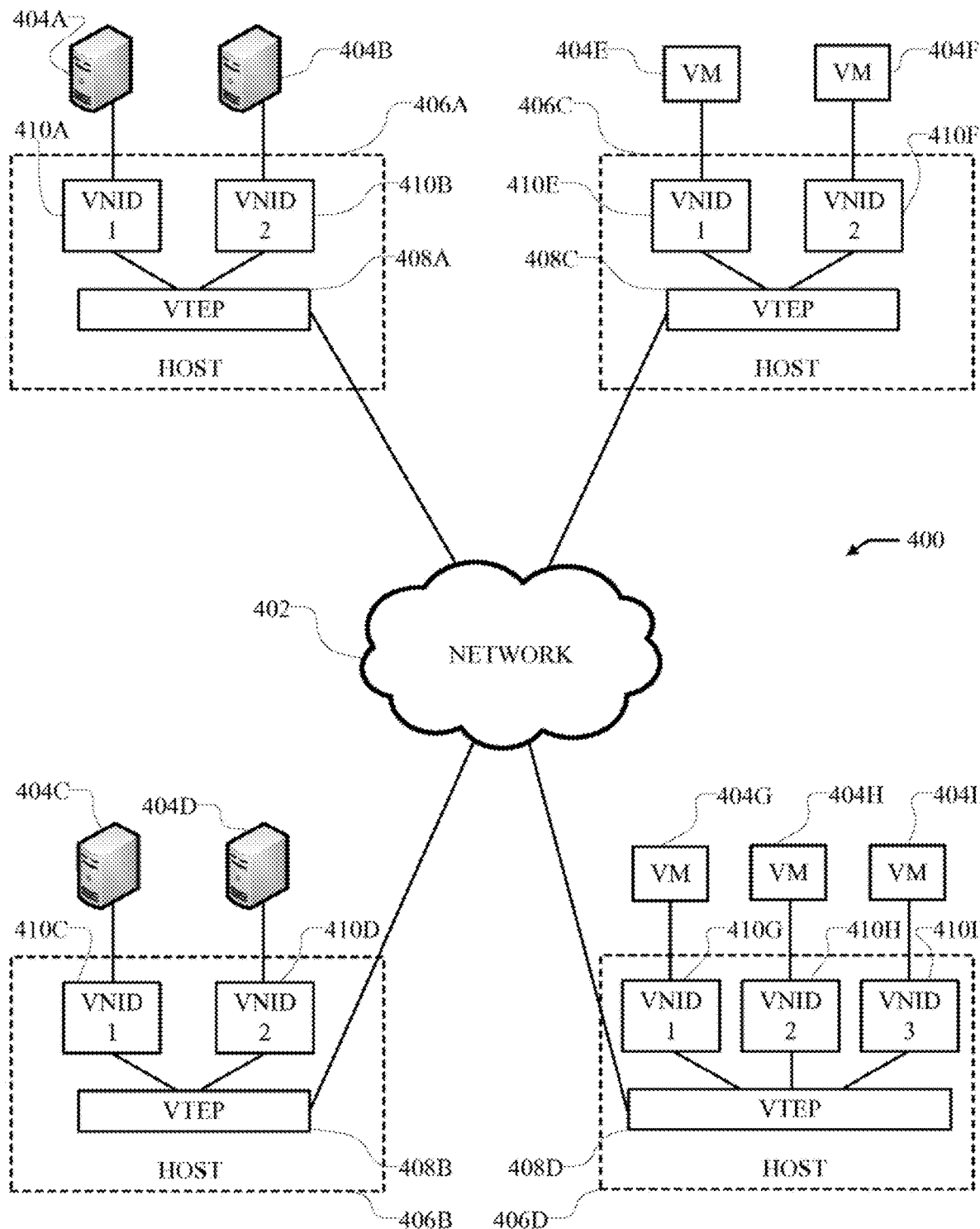
FIG. 4A illustrates an example of a process for presenting a board on a display, where the board has a plurality of document object models (DOMs).
FIG. 4B illustrates another exemplary process for presenting a board on a display, where the board has a plurality of documents object models (DOMs), consistent with disclosed embodiments.

FIG. 4A illustrates an example of a process 400a of presenting a GUI such as a Web page on a display, where the Web page has a plurality of document object models (DOMs). Process 400a may correspond to traditional techniques for presenting a GUI. As shown in step 410, presenting a Web page on a display may include accessing a document object model (DOM) using a scripting language, such as JavaScript. It is contemplated that any scripting or programming language may be used, such as, but not limited to, JavaScript, ECMAScript, Hypertext Preprocessor (PHP), Python, Ruby, Groovy, Perl, Lua, Bash, PowerShell, R, Visual Basic Analysis (VBA), Emacs Lisp, or Generalized Markup Language (GML). It is further contemplated that any coding language may be used, regardless of whether it is a scripting language, such as Hypertext Markup Language (HTML), Extensible Markup Language (XML), Cascading Style Sheets (CSS), Sass, Leaner Style Sheets (LESS), jQuery, PostCSS, React, Vue, Angular, Rails, Grails, Django, Laravel, WordPress, TypeScript, CoffeeScript, Structured Query Language (SQL), or NodeJS.

In some embodiments, and as shown as Style step 420 and Layout step 430, the style and layout of objects within the document object model (DOM) may be determined. For example, Style step 420 may include recalculating the styles of the objects, or style object properties, in the DOM to match the styles of the objects in the DOM to other DOM elements of the Web page. The Layout, or reflow, step 430 may include instructions or designations of where each object in the DOM is to be arranged with respect to the other objects in the DOM.

Furthermore, as shown as Paint step 440, the objects in the DOM may be painted, rasterized, or rendered on the Web page. The Composite step 450 may include a composition of visual layers that are processed and painted independently after the objects in the DOMs are painted, rasterized, or rendered on the board.

As shown in FIG. 4B, embodiments of the present disclosure may include a process 400b that bypasses the Style step 420 and Layout step 430 to display a graphical representation or rendering of the Web page in a reduced duration of time. For example, the Style step 420 of FIG. 4A may take 5.45 milliseconds (ms) to perform. Based on the refresh rate of most screens (60 FPS), the information or objects contained within a DOM may not fully load or be shown if process 400a takes longer than 16.66 ms. As discussed previously, the user experience may decrease when the Web page is not fully loaded and displayed in an adequate duration of time, where the adequate duration of time may be dictated by the screen refresh rate. The bypassing of the Style step 420 and Layout step 430 may reduce the duration of time it takes a Web page to load and be displayed. Furthermore, the bypassing of the Style step 420 and Layout step 430 may be enabled using a canvas layer, as discussed further below.

Embodiments of the present disclosure may include systems, methods, and computer readable media for presenting board graphics. A board may include a visual rendering of a data structure or database containing rows, columns, and cells. The board may be presented on a Web page, a website browser, an application, or using any other computerized technique for displaying or accessing a data structure. Furthermore, a data structure may include a specialized format for organizing, processing, retrieving, and storing information. Board graphics may include the visual representation of information contained in the rows, columns, and cells of the board. For example, board graphics may include, but are not limited to, the color, text, and shape of the information contained in the rows, columns, and cells of the board. In some embodiments, a board may be organized in a grid format, and in other embodiments, the information in the board may be organized using a different format.

In some embodiments, at least one processor may receive a request to present, on a display, a board having a plurality of document object models (DOMs) arranged in rows and columns. The operations may be performed using one or more components of computing device 100 (discussed in FIG. 1) or user device 220 of computing architecture 200

(discussed in FIG. 2). A display may include a screen of a computer, a cell phone, a tablet, a television, a graphical user interface (GUI), or any other physical or non-physical manner of representing, or presenting, the board to a user. A user may include an application developer, a customer, or any other entity that desires to display a Web page or board.

In some embodiments, a document object model (DOM) may be a programming interface for Web documents. For example, a one or more DOMs may define a document as a treelike hierarchy of nodes in which the document is an object containing other objects, such as images and forms. Through DOMs, programs and scripts may access the objects within the DOM to change aspects such as the appearance or behavior of the objects. Thus, the DOM may be a vehicle for adding layers of depth and interactivity to what would otherwise be a static Web page. As discussed previously, the board may include rows, columns, and cells. The board may store information within the rows, columns, and cells, and the stored information may include document object models (DOMs).

A request to present the board may include an indication following an action by the user. For example, the user may open a Web page that contains, or includes, the board. The request to present the board may include a first indication to display the board that follows the action of the user opening the Web page containing the board. As another example, the user may have a Web page containing the board displayed and scroll (e.g., up, down, left, or right) through the Web page, effectively scrolling through the board. The request to present the board may include a second indication to display the board that follows the action of the user scrolling.

Figure 5A:
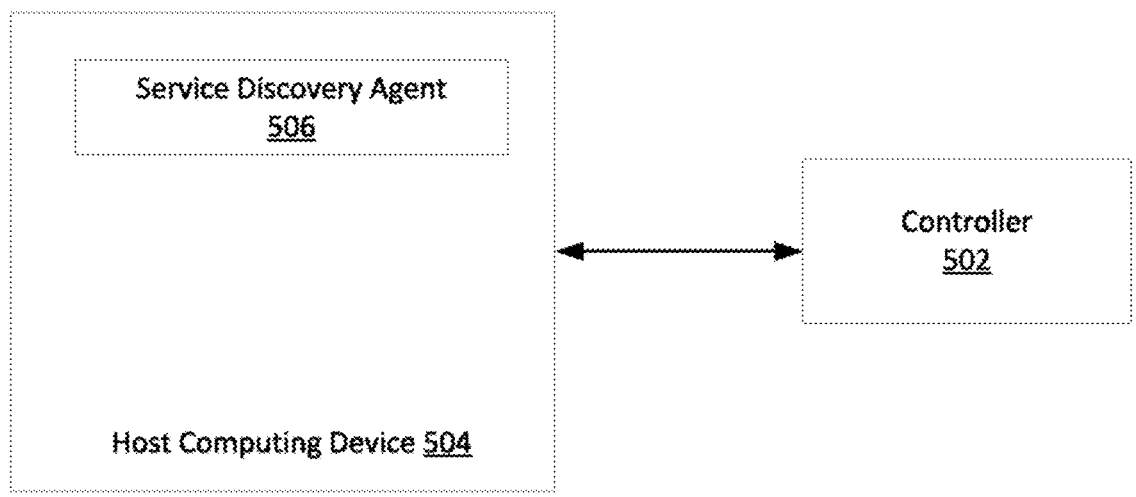
FIG. 5A is an illustration of an exemplary board, consistent with disclosed embodiments.

FIG. 5A is an illustration of an exemplary board 500, consistent with embodiments of the present disclosure. The board 500 may include a board title 502. Board title 502 may be any descriptive title, title designated by the user, or any other semantic tool. As shown in FIG. 5A, the board 500 may include rows, columns, and cells. For example, columns of board 500 may include an item column 510, an assignment column 520, a task type column 530, a due date column 540, a completion column 550, a detailed description column 560, and a notes column 570. Board 500 may include any type of column designated for any purpose and is not limited to the columns shown in FIG. 5A. Furthermore, board 500 may include columns in any arrangement or order, and the arrangement or order is not limited to the arrangement or order shown in FIG. 5A. Furthermore, board 500 may include rows, such as row 580, and cells, such as cell 590. The intersection between a column, such as item column 510, and a row may include a cell, such as cell 590.

As shown in FIG. 5A, each column may include a type of information. For example, item column 510 may include text information 512. Assignment column 520 may include an icon, or image, information 522. Completion column 550 may include data visualization information 552. Columns may include any type of information that may be useful to the user and are not limited to the types of information shown in FIG. 5A. For example, as shown in FIG. 5A, item column 510 may include icon information 522. In other embodiments, item column 510 may include a type of information not shown in FIG. 5A, such as, but not limited to, symbolic information, color information, hyperlink information, metadata information, or any combination thereof.

In some embodiments, at least one processor may generate a canvas layer of the board. A canvas layer may be a translation, or transformation, of the plurality of DOMs of the board into a drawing-based or graphic-based representation (e.g., graphical representation) of the board. For example, the canvas layer may include a graphical representation of each of the plurality of DOMs. In some embodiments, the canvas layer may create the graphical representation of each of the plurality of DOMs by drawing at least a border of one or more of the columns, one or more of the rows, or one or more cells.

Furthermore, in some embodiments, the graphical representation of each of the plurality of DOMs may include at least one graphical characteristic. For example, some DOMs may include a large number of objects or one or more complicated objects, making the DOM difficult to recreate in its entirety when creating the canvas layer. Thus, the graphical representation for these DOMs may include at least one graphical characteristic, such as, but not limited to, a color or a shape, to provide a generic depiction or representation of the board. This may reduce the duration of time it takes to load the Web page or board and maintain a depiction or representation of information to the user.

Figure 5B:
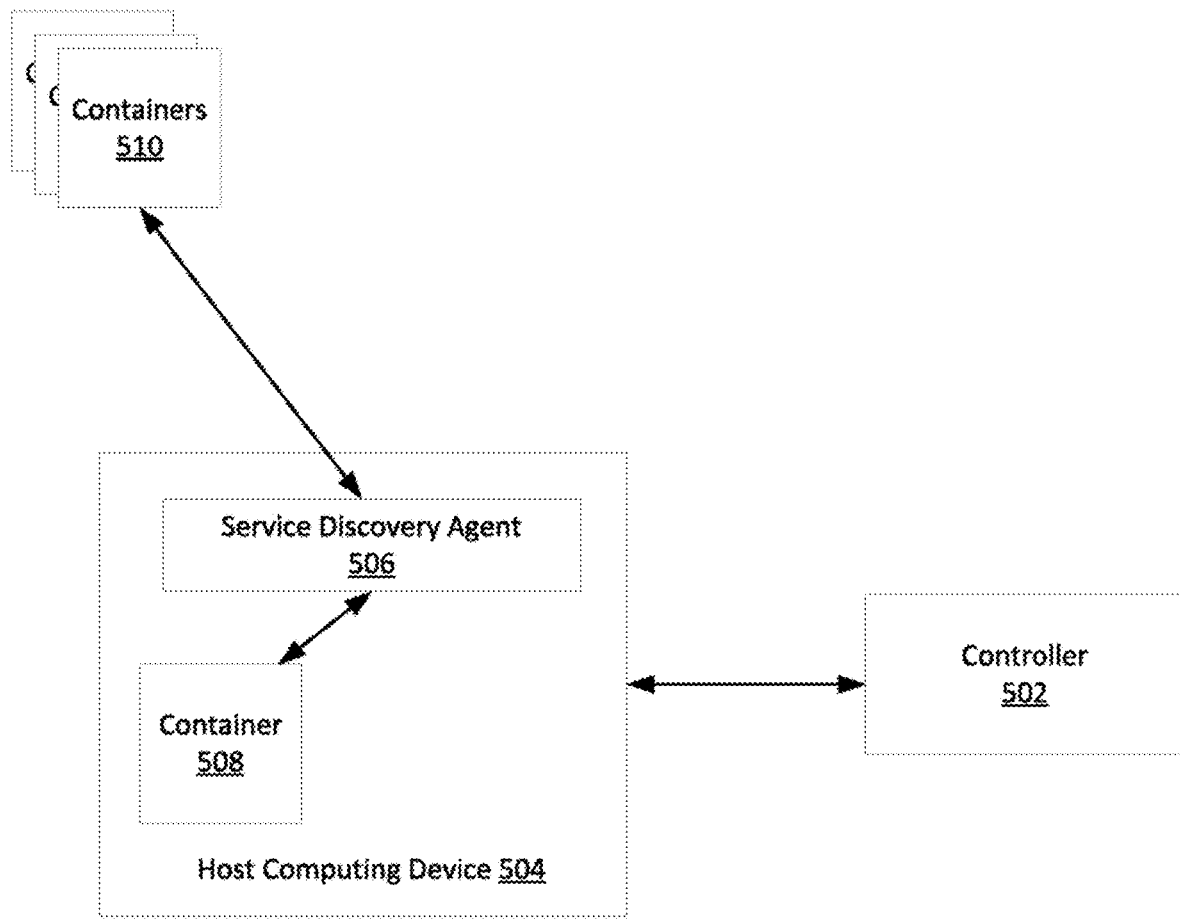
FIG. 5B is an illustration of an exemplary board showing an interactive element, consistent with disclosed embodiments.
Figure 5C:
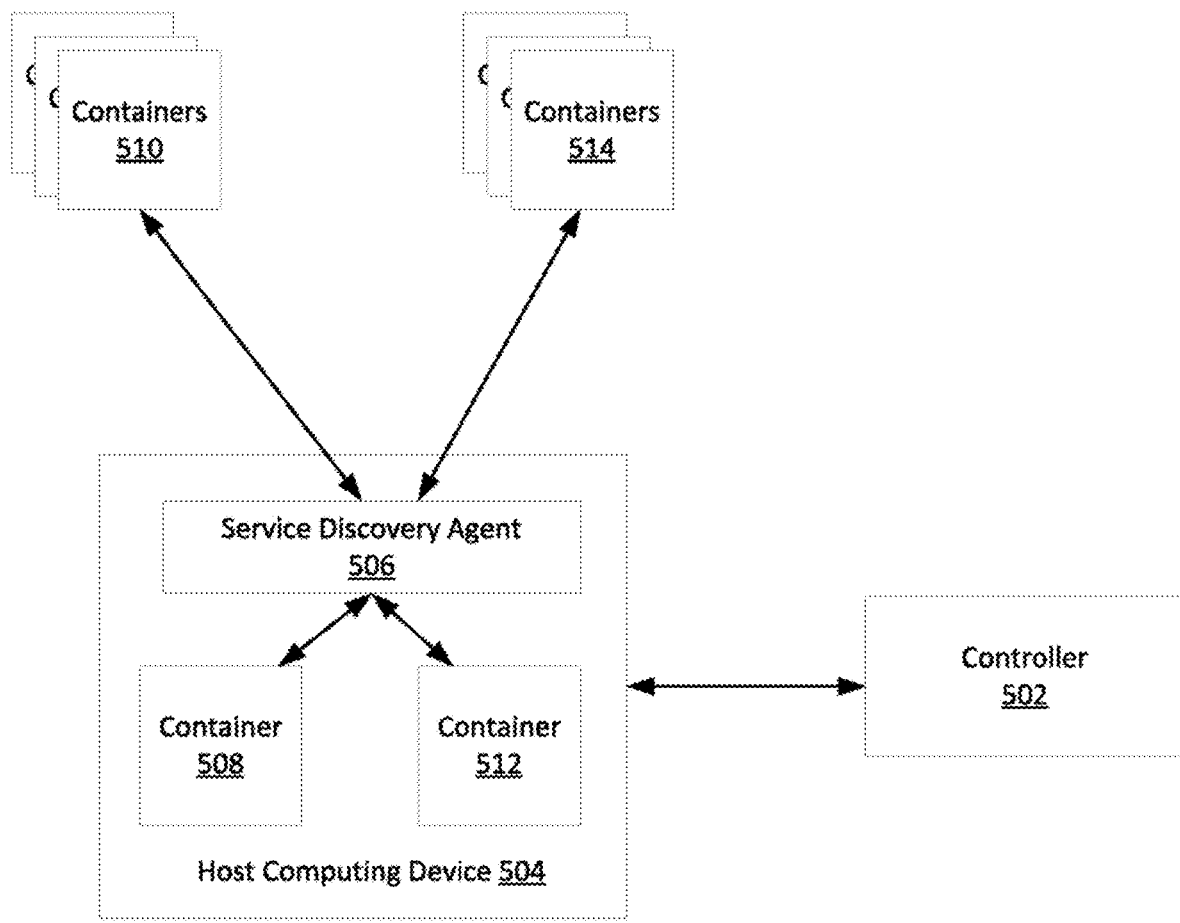
Figure 5D:
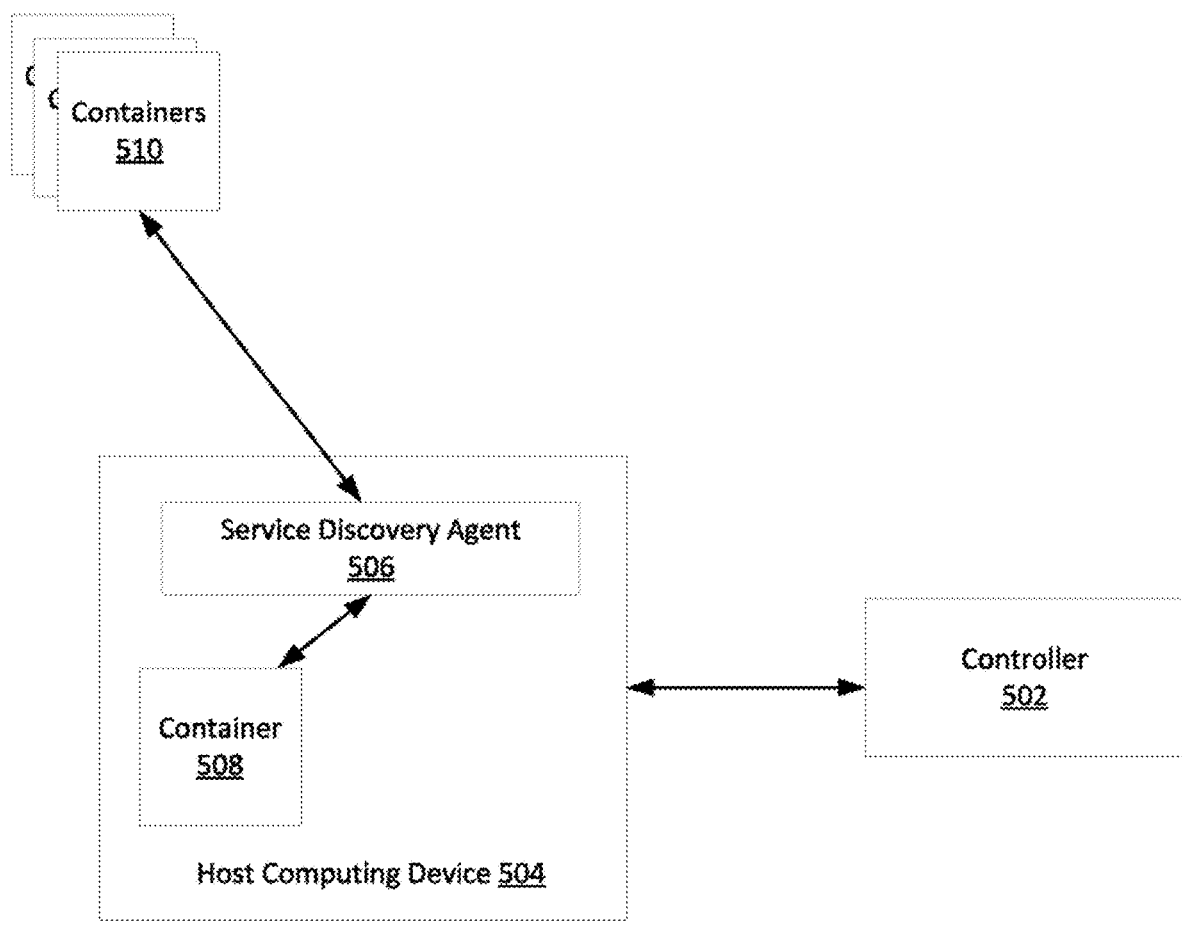

FIG. 5B is an illustration of an exemplary board showing an interactive element, consistent with embodiments of the present disclosure. As shown in FIG. 5B, the board may include a task type column 530, and the task type column 530 may include cells containing information related to the type of task. Each cell of the task type column 530 may include a drop-down function, where upon clicking on the cell, a drop-down 532 of selectable items—such as Task X, Task Y, and Task Z—are shown. Each cell of the task type column 530 may include information related to a particular selectable item that was previously input by, for example, a user.

The canvas layer may include the translation of each of the cells of the task type column 530 into graphics-based representations of each cell. For example, the canvas layer may include a "painting," graphical rendering, or graphical representation, of the text information related to a particular selected item in the task type column 530. Thus, the drop-down function may not be preserved in the canvas layer. For example, the canvas layer may present the board as shown in FIG. 5A. Upon clicking a column in the task type column 530 of the canvas layer, the board may continue to be shown or displayed as FIG. 5A, as opposed to showing or displaying the drop down 532 of FIG. 5B. Thus, the canvas layer may be considered non-interactive. As used herein, non-interactive may relate to not involving, requiring, or responding to the actions or input of a user.

In some embodiments, the board may include at least one cell that remains a DOM when presented on the display. For example, the canvas layer may include at least one of the plurality of DOMs. The board may include an item column or a header row that remains a DOM when presented on the display. In such embodiments, the at least one cells may remain visible on the display even while scrolling to another part of the board. In this example, and in other possible examples, the plurality of DOMs may remain interactive while the other plurality of DOMs may be represented by their graphical representations and be non-interactive.

For example, in a canvas layer, the task type column 530 of FIG. 5B may remain a plurality of DOMs, while the rest of the board is presented as graphical representations of their respective plurality of DOMs. The task type column 530 may remain interactive, and the user may click a cell in the task type column 530 while the canvas layer is presented on the display, and the respective drop-down 532 may appear.

In some embodiments, the graphical representation of each of the plurality of DOMs may be generated prior to receiving the request to present. Furthermore, in some embodiments, a plurality of types of DOMs may be received and a graphical representation may be generated for each of the plurality of the types of DOMs prior to the generating of the canvas layer. For example, a type of DOM may be a DOM associated with a generic icon, such as the icon shown in assignment column 520 of FIG. 5A. Another type of DOM may be a DOM associated with a generic data visualization, such as the data visualization shown in completion column 550 of FIG. 5A. Each type of DOM may be associated with a different type of information to be shown. A graphical representation of each type of DOM may be created or generated prior to the generating of the canvas layer. For example, a graphical representation of a generic icon may include a circle, as shown in FIG. 5A. As another example, a graphical representation of a generic data visualization may include a rectangle with text, as shown in FIG. 5A. There may be any number of types of DOMs and in some embodiments, each type of DOM may be associated with any type of information to be displayed and is not limited to what is discussed above. Furthermore, in some embodiments, the graphical representation of each of the plurality of DOMs may be generated using artificial intelligence (AI) based on previous types of DOMs created by a user or other users.

In some embodiments, at least one processor may determine, for each of the plurality of types of DOMs, a duration of time required to generate a corresponding graphical representation of each of the plurality of types of DOMs. Each of the determined durations of time may be compared to a desired duration of time. Embodiments of the present disclosure may identify one or more of the plurality of types of DOMs based on the comparing, where the determined duration of time of the identified one or more of the plurality of types of DOMs may be greater than the desired duration of time. Some embodiments may involve generating a blank cell as the graphical representation for the identified one or more of the plurality of types of DOMs.

For example, the duration of time required to generate a corresponding graphical representation of a first type of DOM may be 14 ms and the duration of time required to generate a corresponding graphical representation of a second type of DOM may be 18 ms. The desired duration of time may be determined by a refresh rate of a display such as, for example, 60 FPS. Thus, the desired duration of time may be 16.66 ms. The durations of time required to generate corresponding graphical representations for the first types of DOM (14 ms) and second type of DOM (18 ms) may be compared to the desired duration of time (16.66 ms). The second type of DOM may be identified, as the duration of time required to generate the corresponding graphical representation of the second type of DOM (18 ms) is greater than the desired duration of time (16.66 ms) in this example. Thus, a blank cell may be generated as the graphical representation for the identified second type of DOM. This may improve processing speed and reduce processing power consumption when recreating, representing, rendering, drawing, or painting graphical representations of complicated DOMs.

In some embodiments, at least one processor, may generate a library of locations on the canvas layer. As used herein, a library of locations may refer to a repository containing coordinates, or coordinate points, relating each of the plurality of DOMs or each graphical representation of each of the plurality of DOMs to a particular location on the canvas layer. The coordinates may include a measurement in the x-direction and a measurement in the y-direction relating to where the graphical representation of a DOM should be placed, shown, or displayed on a canvas layer. In some embodiments, the coordinates may be calculated or determined with respect to a particular point on the display, a particular point on a presented portion of the canvas layer, or a particular point located on the canvas layer. Thus, the library of locations may store an arrangement of the plurality of DOMs.

For example, the request to present may include a desired arrangement of the plurality of DOMs, and the library of locations may be configured to adjust the arrangement of the plurality of DOMs based on the desired arrangement. As used herein, an arrangement may refer to the location of items, such as a DOM, with respect to other items, such as another DOM, a point on the display, a point on the presented portion of the canvas layer, or a point on the canvas layer.

In some embodiments, at least one processor may present, on the display, a portion of the canvas layer. As discussed previously, the display may include a screen of a computer, a cell phone, a tablet, a television, a graphical user interface (GUI), or any other physical or non-physical manner of representing, or presenting, the board to the user. The presented portion of the canvas layer may be determined by a size of the display. For example, the display may be a computer monitor with a screen, and the screen may be 9 inches by 15 inches. The presented portion of the canvas layer may match the size of the screen, such that the presented portion of the canvas layer is 9 inches by 15 inches.

Figure 6:
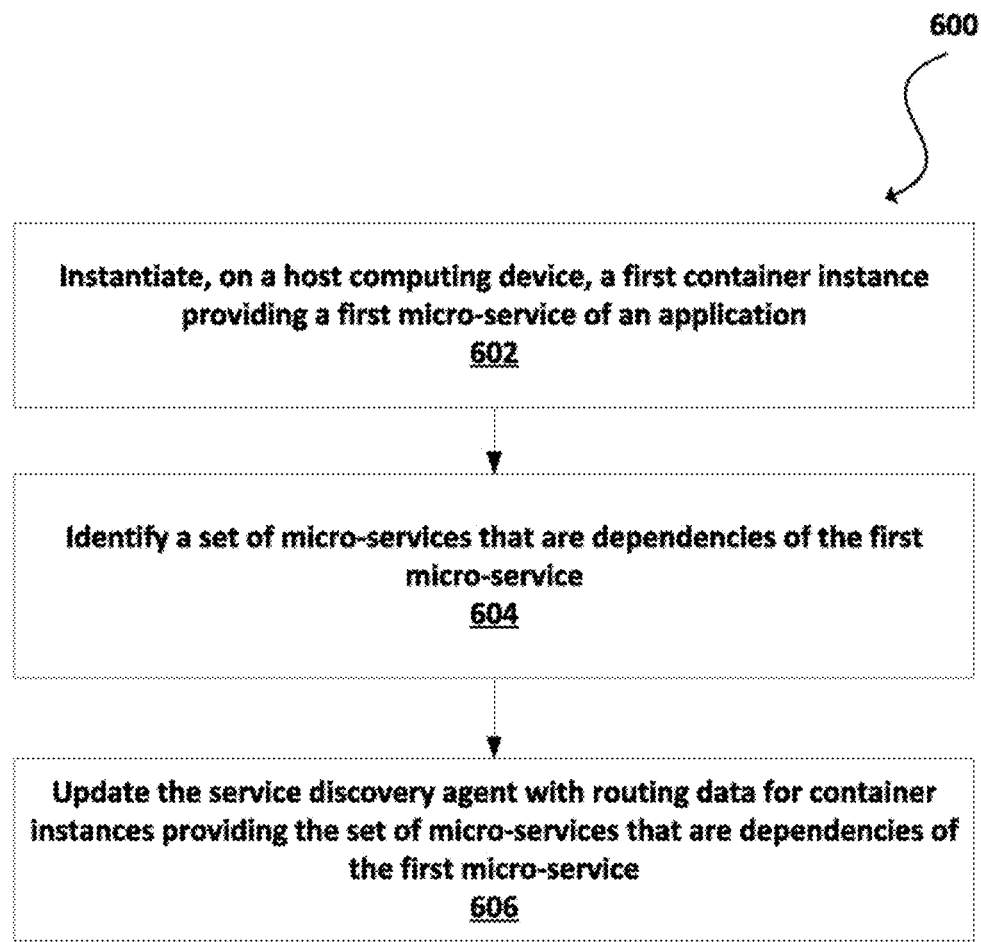
FIG. 6A is an illustration of a canvas layer and a presented portion of the canvas layer, consistent with disclosed embodiments.
FIG. 6B is an illustration of a canvas layer and a presented portion of the canvas layer during or after a transforming of the graphical representations of the presented plurality of DOMs into the corresponding plurality of DOMs, consistent with disclosed embodiments.

FIG. 6A is an illustration of a canvas layer 610 and a presented portion 630 of the canvas layer 610, consistent with embodiments of the present disclosure. Canvas layer 610 may include graphical representations 620 of document object models (DOMs). As shown in FIG. 6A, canvas layer 610 may be larger than the presented portion 630 of the canvas layer 610. In some embodiments, the canvas layer may be the same size as the presented portion. As discussed above, the size of the present portion 630 may be determined or dictated by the size of a display, where the display may be, for example, a screen of a computer monitor.

Furthermore, the presented portion 630 may be associated with coordinates, or locations, 630*a*, 630*b*, 630*c*, and 630*d* (630*a* through 630*d*). Coordinates 630*a* through 630*d* may be determined by the size of the display and the location of the display relative to the entire canvas layer 610 or an origin 680. In some embodiments, coordinates 630*a* through 630*d* may include a measurement in the x-direction and a measurement in the y-direction.

For example, in some embodiments, coordinate 630*a* may be (30, 110), indicating that the top left corner of the presented portion 630 may be at 30 units in a positive x-direction and 110 units in a positive y-direction from an origin 680. Coordinate 630*b* may be (500, 110), indicating that the top right corner of presented portion 88-6-30 may be at 500 units in a positive x-direction and 110 units in a positive y-direction from origin 680. Coordinate 630*c* may be (500, 30), indicating that the bottom right corner of presented portion 630*c* may be at 500 units in a positive x-direction and 30 units in a positive y-direction from origin 680. Coordinate 630*d* may be (30, 30), indicating that the bottom left corner of presented portion 630*d* may be at 30 units in a positive x-direction and 30 units in a positive y-direction from origin 680. Origin 680 may be any point on the canvas layer 610 that allows a relative measurement to be made to determine the coordinates of DOMs on the canvas layer.

In some embodiments, each of the graphical representations 620 of document object models (DOMs) may be associated with one or more coordinates or sets of coordinates. For example, graphical representation 640 may be associated with coordinates 640a through 640d. Coordinates 640a through 640d may indicate where graphical representation 640 is located or arranged on the presented portion 630 or the canvas layer 610 with respect to origin 680. In some embodiments, coordinates 640a through 640d may be calculated or determined relative to coordinates of other graphical representations 620 of DOMs. Furthermore, in some embodiments, coordinates 640a through 640d may be calculated or determined relative to any other designated points on canvas layer 610 or presented portion 630.

Coordinates 630a through 630d and 640a through 640d may be stored in a library of locations (not shown). As discussed previously, the library of locations may store the arrangement of the graphical representation of the plurality of DOMs or the arrangement of the plurality of DOMs. The graphical representation of the plurality of DOMs may share the same location coordinates or arrangement as each corresponding DOM of the plurality of DOMs.

As discussed previously, presented portion 630 may be located anywhere on canvas layer 610. In some embodiments, presented portion 630 may change location relative to canvas layer 610 or origin 680 over time, such as during scrolling (e.g., up, down, left, or right) by a user. For example, the portion of the canvas layer may be displayed during a scrolling of the board, and the portion of the canvas layer displayed may change during the scrolling of the board.

In some embodiments, the board may include at least one cell that remains a DOM when presented on the display. For example, the canvas layer may include at least one of the plurality of DOMs. For example, the board may include an item column or a header row that remains a DOM when presented on the display. In this example, and in other possible examples, the plurality of DOMs may remain interactive while the other plurality of DOMs may be represented by their graphical representations and be non-interactive.

For example, in a canvas layer, the task type column 530 of FIG. 5B may remain a plurality of DOMs, while the rest of the board is presented as graphical representations of their respective plurality of DOMs. The task type column 530 may remain interactive, and the user may click a cell in the task type column 530 while the canvas layer is presented on the display, and the respective drop-down 532 may appear or be shown.

In some embodiments, the at least one processor may transform the graphical representation of each of the plurality of DOMs presented on the display into a corresponding DOM of the plurality of DOMs. As used herein, transforming may include (i) replacing the graphical representations of the plurality of DOMs of the presented portion of the canvas layer with the corresponding plurality of DOMs, or (ii) overlaying the corresponding plurality of DOMs on top of the graphical representations of the plurality of DOMs of the presented portion of the canvas layer. In some embodiments, the transforming may occur at a rate that corresponds with a refresh rate of the display. For example, the refresh rate of the display may be 60 FPS such that 60 frames appear on the computer monitor display within one second, or one frame appears every 16.66 millisecond (ms). As used herein, a frame may include a still image that is displayed. Movement or motion of a display may be shown by displaying several consecutive frames or still images. Thus, the transforming may occur at 60 FPS to maintain, or match, the refresh rate of the display. In other embodiments, the frame rate may be any suitable frame rate such as, but not limited to, 30-45 FPS. The frame rate may vary depending on the type of display or the refresh rate of the display.

In some embodiments, the transforming may occur after presenting the portion of the canvas layer for a time period. A time period may include 5 milliseconds, 10 milliseconds, 15 milliseconds, 20 milliseconds, or any other suitable duration of time. For example, the portion of the canvas layer may be presented for 10 milliseconds. After the 10 milliseconds has elapsed or passed, the transforming may occur.

Furthermore, in some embodiments, the at least one processor may determine the time period based on an event that precedes receiving the request to present. An event that precedes receiving the request to present may include a previous status of the board, display, or a user action. For example, the event may include the user opening a Web page containing the board. Thus, it may be desired for the transforming to occur immediately. Immediately may refer to within or under 10 milliseconds (ms). The time period may be determined based on an event, such as the user opening the website browser containing the board, and the time period may be 5 ms. In some embodiments, the time period may be any duration of time that a user can expect a Web page to be fully loaded or interactive after opening said Web page. As used herein, interactive may pertain to allowing a two-way flow of information between a computer and a computer-user or responding to a user input.

As another example, an event that precedes receiving the request to present may include a scrolling action by the user. For example, the event may include the user scrolling (e.g., up, down, left, or right) through the board. The scrolling action may include a rate of scroll. For example, the at least one processor may determine a rate, such as an amount of distance scrolled over a predetermined time period, or one or more characteristics of a scrolling gesture indicative of a scrolling rate. In such embodiments, the at least one processor may determine whether the scrolling rate exceeds a threshold, indicative of the event. In some embodiments, the event may be associated with scrolling for longer than a threshold time period. The time period may be determined based on the rate of scroll of the scrolling action by the user. For example, the time period may be 10 milliseconds. In some embodiments, the time period determined based on the event being scrolling may be longer than the time period determined based on the event being opening a Web page containing the board. This may be due to the desire to ensure the user has stopped scrolling and intends to view the displayed portion of the board as the plurality of DOMs before performing the transforming. Thus, the time period may be any duration of time that indicates a user has stopped scrolling. In some embodiments, the transforming may occur when the user is no longer scrolling (e.g., the presented portion of the canvas layer is no longer moving or changing) and the user hovers over an item of the board. This may allow the board to become interactive for the user.

In some embodiments, the request to present may include a desired time frame. The transforming may stop after a second desired time within the desired time frame has elapsed. For example, the desired time frame included in the request to present may be determined by the refresh rate of the display, such as 16.66 ms. The second desired time may be 15 ms and thus may fall within the desired time frame of 16.66 ms. Thus, the transforming may stop after 15 ms, the second desired time, has elapsed. The desired time frame may be any duration of time associated with a refresh rate of any type of display, as the refresh rate may vary depending on the type of display. Furthermore, the second desired time may be any duration of time within the desired time frame.

In some embodiments, stopping the transformation after the second desired time has elapsed may reduce the processing power required to transform the graphical representation of each of the plurality of DOMs into each of the corresponding plurality of DOMs. Furthermore, in some embodiments, the second desired time may be determined by an action of the user, such as scrolling, to reduce scrolling "stickiness." For example, if the user is scrolling, the second desired time may correspond with the rate of scrolling of the user. In these ways and other ways discussed herein, the performance of the at least one processor may be enhanced, by reducing the required computer resources for displaying the board graphics.

FIG. 6B is an illustration of a canvas layer 610 and a presented portion 630 of the canvas layer 610 during or after a transforming of the graphical representations 620 of the plurality of DOMs into the corresponding plurality of DOMs 650, consistent with embodiments of the present disclosure. As shown in FIG. 6B, document object model (DOM) 670 may include coordinates 670a through 670d. Coordinates 670a through 670d may contain the same values as coordinates 640a through 640d of the corresponding graphical representation 640 of the DOM shown in FIG. 6A. Furthermore, as shown in FIG. 6B, the transforming into the corresponding plurality of DOMs 650 may occur for the graphical representations of DOMs displayed on the presented portion 630. The plurality of graphical representations 620 of DOMs not displayed on the presented portion may remain graphical representations 620.

In some embodiments, the transforming may further include determining a transformation ratio for the plurality of DOMs presented on the display. The transforming of the plurality of DOMs presented on the display into a corresponding DOM of the plurality of DOMs may be based on the determined transformation ratio. The transformation ratio may include a ratio of the transformation rate of a presented portion of the canvas layer to the refresh rate of a display.

As an example, a presented portion of a canvas layer of a board may include ten (10) graphical representations of DOMs. In some embodiments, the system may determine an amount of time or processing power require to load a subset of the DOMs, to estimate or determine an approximate loading time or rate for loading each of the DOMs. The system may then calculate an average loading time per DOM, and associate the average loading time with a transformation rate. For example, if the refresh rate of the system running at 60 fps is determined to be 16.6 ms, and the system determines that the average transformation time for a single DOM is 3.8 ms, then the system may calculate 16.66/3.8=4.38 DOMs per frame to maintain a 60 fps frame rate. Thus, the system may determine that it can load no more than 4 DOMs per frame, to maintain a full 60 fps frame rate.

As another example, a transformation rate may be determined in accordance with the following technique. In the detailed example below, the transformation from each of the graphical representations to the corresponding DOMs may take 3.8 ms each.

$$3.8 \text{ ms} * 10 = 38 \text{ ms} \tag{1}$$

Thus, it may take 38 ms to transform the 10 graphical representations of DOMs into the 10 corresponding DOMs, as described in Eq. 1.

The transformation rate may be determined by the duration of time required to transform the graphical representations into the corresponding DOMs.

$$\frac{1 \text{ frame}}{38 \text{ ms}} * \frac{1000 \text{ ms}}{1s} = 26.31 \text{ frames per second(FPS)} \tag{2}$$

In this example, the transformation rate may be 26 frames per second (FPS), as described in Eq. 2.

The board may be presented on a display that has a refresh rate of 60 frames per second (FPS). Thus, the transformation ratio may be any mathematical representation or expression of the ratio between the transformation rate and refresh rate. For example, the transformation ratio may be 26:60.

$$\frac{26 \text{ FPS}}{60 \text{ FPS}} = 0.433 \tag{3}$$

Based on the transformation ratio, a subset of the plurality of DOMs (e.g., 4 DOMs, as described in Eq. 3), may be transformed to prevent hindering the refresh rate or the loading of the board, which may decrease user experience.

Furthermore, as used herein, transforming may be bi-directional. For example, transforming may include transforming a graphical representation of each of the plurality of DOMs presented on the display into a corresponding DOM of the plurality of DOMs. Transforming may also include transforming a plurality of DOMs into corresponding graphical representations of each of the DOMs. The latter may occur during termination of the display of a plurality of DOMs.

In some embodiments, in response to terminating display of a subset of the plurality of DOMs, the at least one processor may revert the subset of the plurality of DOMs to respective graphical representations of the subset of the plurality of DOMs. For example, during scrolling, a subset of the plurality of DOMs may no longer be displayed and a new or different portion of the canvas layer may be displayed. The termination of a display may include no longer displaying either a portion or all of the canvas layer or a portion or all of the plurality of DOMs. The subset of the plurality of DOMs no longer displayed may be reverted to their respective graphical representations. This may preserve memory of the system, as the graphical representations of the plurality of DOMs may occupy a smaller amount of memory when stored compared to the storing of the plurality of DOMs. Furthermore, in some embodiments, this may improve processing speed and reduce the amount of processing power required by the processor to present board graphics, increasing efficiency of the at least one processor.

FIG. 7 illustrates a flowchart for presenting board graphics 700, consistent with embodiments of the present disclosure. As shown in step 700710, in some embodiments, at least one processor may receive a request to present, on a display, a board having a plurality of document object models (DOMs) arranged in rows and columns. Disclosed embodiments may generate a canvas layer of the board, as shown in step 720. The canvas layer may include a graphical representation of each of the plurality of document object models (DOMs). Some embodiments, and as shown in step 730, may generate a library of locations on the canvas layer. The library of locations may store an arrangement of the plurality of DOMs. As shown in step 740, some embodiments may present, on the display, a portion of the canvas layer. The presented portion of the canvas layer may be determined by a size of the display. Some embodiments may transform the graphical representation of each of the plurality of DOMs presented on the display into a corresponding DOM of the plurality of DOMs, as shown in step 750.

Disclosed embodiments provide enhanced techniques for visualizing and displaying GUIs that are rich in information while maintaining interactivity and accessibility. Traditional systems may be limited to only a user selected one or more elements or cells on a presented portion of a board being interactive. In disclosed embodiments, for example, after the transforming, the entire presented portion of the board may be interactive. This may allow Web page extensions, such as accessibility extensions, or other third party applications to identify and interact with all elements or cells of the presented portion of the board instead of only the user selected elements or cells of the board. Thus, in some embodiments, the accessibility of the board is increased relative to traditional systems.

Furthermore, the disclosed embodiments provide enhanced techniques for visualizing and displaying GUIs that are rich in information, especially while performing navigation operations such as scrolling through a document. The disclosed embodiments allow documents or other GUIs that are rich in DOMs to be fully shown at all times of the user's experience, thereby conveying information contained in parts of the GUI that are being scrolled, without sacrificing computer performance or experiencing "stickiness" in the displayed GUI. Traditional systems often strip data-rich GUIs of their appearance and replace portions of the GUI with generic placeholders while scrolling, maintaining frame rates yet conveying little-to-none of the content contained in the GUI being scrolled.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following elements alone or in combination with one or more other elements, whether implemented as a method, by at least one processor, and/or stored as executable instructions on non-transitory computer-readable media. Disclosed embodiments may include a system for presenting board graphics. The system may include at least one processor configured to receive a request to present, on a display, a board having a plurality of document object models (DOMs) arranged in rows and columns. The at least one processor may generate a canvas layer of the board. The canvas layer may include a graphical representation of each of the plurality of DOMs. The graphical representation of each of the plurality of DOMs may be generated prior to receiving the request to present. The canvas layer may also include at least one of the plurality of DOMs. The canvas layer may create the graphical representation of each of the plurality of DOMs by drawing at least a border of one or more of the columns, one or more of the rows, or one or more cells. The graphical representation of each of the plurality of DOMs may include may least one graphical characteristic. Prior to generating the canvas layer, a plurality of types of DOMs may be received and a graphical representation may be generated for each of the plurality of types of DOMs. The at least one processor may generate a library of locations on the canvas layer. The library of locations may store an arrangement of the plurality of DOMs. The at least one processor may present, on the display, a portion of the canvas layer. The presented portion of the canvas layer may be determined by a size of the display. The portion of the canvas layer may be displayed during a scrolling of the board. The board may include at least one cell that remains a DOM when presented on the display. The at least one cell may be one or more of an item column or a header row. The at least one processor may transform the graphical representation of each of the plurality of DOMs presented on the display into a corresponding DOM of the plurality of DOMs. The transforming may occur at a rate that maintains a frames per second (FPS) rate of the display. The transforming may occur after presenting the portion of the canvas layer for a time period. The time period may be determined based on an event that precedes receiving the request to present. The event that precedes the request to present may be a scrolling action by the user. The scrolling action may include a rate of scroll and the time period may be determined based on the rate of scroll. In response to terminating display of a subset of the plurality of DOMs, the subset of the plurality of DOMs may be reverted to respective graphical representations of the subset of the plurality of DOMs. The transforming may further comprise determining a transformation ratio for the plurality of DOMs presented on the display and, based on the determined transformation ratio, transform the graphical representation of each of the plurality of DOMs presented on the display into a corresponding DOM of the plurality of DOMs. The request to present may include a desired time frame, and the transforming may stop after a second desired time within the desired time frame has elapsed. The request to present may include a desired arrangement of the plurality of DOMs, and the library of locations may be configured to adjust the arrangement of the plurality of DOMs based on the desired arrangement. The at least one processor may determine, for each of the plurality of types of DOMs, a duration of time required to generate a corresponding graphic representation of each of the plurality of types of DOMs. The at least one processor may compare each of the determined durations of time to a desired duration of time. The at least one processor may identify one or more of the plurality of types of DOMs based on the comparing. The determined duration of time of the identified one or more of the plurality of types of DOMs may be greater than the desired duration of time. The at least one processor may generate a blank cell as the graphical representation for the identified one or more of the plurality of types of DOMs.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may some-times be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that, when executed, cause at least one processor to perform operations for presenting board graphics, the operations comprising:
    receiving a request to present, on a display, a board having a plurality of document object models (DOMs) arranged in rows and columns;
    generating a canvas layer of the board, wherein the canvas layer includes a graphical representation of each of the plurality of DOMs;
    generating a library of locations on the canvas layer, wherein the library of locations stores an arrangement of the plurality of DOMs;
    presenting, on the display, a portion of the canvas layer, wherein the presented portion of the canvas layer is determined by a size of the display; and
    transforming the graphical representation of each of the plurality of DOMs presented on the display into a corresponding DOM of the plurality of DOMs,
    wherein the request to present includes a desired time frame,
    wherein the transforming occurs at a rate that corresponds with a refresh rate of the display, and
    wherein the transforming stops after a second desired time within the desired time frame has elapsed.

2. The non-transitory computer readable medium of claim 1, wherein in response to terminating display of a subset of the plurality of DOMs, the subset of the plurality of DOMs are reverted to respective graphical representations of the subset of the plurality of DOMs.

3. The non-transitory computer readable medium of claim 1, wherein the canvas layer further includes at least one of the plurality of DOMs.

4. The non-transitory computer readable medium of claim 1, wherein the board includes at least one cell that remains a DOM when presented on the display.

5. The non-transitory computer readable medium of claim 4, wherein the at least one cell is one or more of an item column or a header row.

6. The non-transitory computer readable medium of claim 1, wherein the canvas layer creates the graphical representation of each of the plurality of DOMs by drawing at least a border of one or more of the columns, one or more of the rows, or one or more cells.

7. The non-transitory computer readable medium of claim 6, wherein the graphical representation of each of the plurality of DOMs includes at least one graphical characteristic.

8. The non-transitory computer readable medium of claim 1, wherein the portion of the canvas layer is displayed during a scrolling of the board.

9. The non-transitory computer readable medium of claim 1, wherein
    the request to present includes a desired arrangement of the plurality of DOMs, and
    the library of locations is configured to adjust the arrangement of the plurality of DOMs based on the desired arrangement.

10. The non-transitory computer readable medium of claim 1, wherein the graphical representation of each of the plurality of DOMs is generated prior to receiving the request to present.

11. The non-transitory computer readable medium of claim 1, wherein prior to generating the canvas layer, a plurality of types of DOMs are received and a graphical representation is generated for each of the plurality of types of DOMs.

12. A non-transitory computer readable medium containing instructions that, when executed, cause at least one processor to perform operations for presenting board graphics, the operations comprising:
receiving a request to present, on a display, a board having a plurality of document object models (DOMs) arranged in rows and columns;
generating a canvas layer of the board, wherein the canvas layer includes a graphical representation of each of the plurality of DOMs;
generating a library of locations on the canvas layer, wherein the library of locations stores an arrangement of the plurality of DOMs;
presenting, on the display, a portion of the canvas layer, wherein the presented portion of the canvas layer is determined by a size of the display; and
transforming the graphical representation of each of the plurality of DOMs presented on the display into a corresponding DOM of the plurality of DOMs,
wherein the transforming occurs after presenting the portion of the canvas layer for a time period,
wherein the time period is determined based on an event that precedes receiving the request to present,
wherein the event that precedes receiving the request to present is a scrolling action by a user, and
wherein the scrolling action includes a rate of scroll, and the time period is determined based on the rate of scroll.

13. A non-transitory computer readable medium containing instructions that, when executed, cause at least one processor to perform operations for presenting board graphics, the operations comprising:
receiving a request to present, on a display, a board having a plurality of document object models (DOMs) arranged in rows and columns;
generating a canvas layer of the board, wherein the canvas layer includes a graphical representation of each of the plurality of DOMs;
generating a library of locations on the canvas layer, wherein the library of locations stores an arrangement of the plurality of DOMs;
presenting, on the display, a portion of the canvas layer, wherein the presented portion of the canvas layer is determined by a size of the display; and
transforming the graphical representation of each of the plurality of DOMs presented on the display into a corresponding DOM of the plurality of DOMs, the transforming further comprising:
determining a transformation ratio for the plurality of DOMs presented on the display; and
based on the determined transformation ratio, transforming the graphical representation of each of the plurality of DOMs presented on the display into a corresponding DOM of the plurality of DOMs,
wherein the transforming occurs at a rate that corresponds with a refresh rate of the display.

14. A non-transitory computer readable medium containing instructions that, when executed, cause at least one processor to perform operations for presenting board graphics, the operations comprising:
receiving a request to present, on a display, a board having a plurality of document object models (DOMs) arranged in rows and columns;
determining, for each of the plurality of types of DOMs, a duration of time required to generate a corresponding graphical representation of each of the plurality of types of DOMs;
comparing each of the determined durations of time to a desired duration of time;
identifying one or more of the plurality of types of DOMs based on the comparing, wherein the determined duration of time of the identified one or more of the plurality of types of DOMs is greater than the desired duration of time;
generating a canvas layer of the board, wherein the canvas layer includes a graphical representation of each of the plurality of DOMs;
generating a blank cell as the graphical representation for the identified one or more of the plurality of types of DOMs;
generating a library of locations on the canvas layer, wherein the library of locations stores an arrangement of the plurality of DOMs;
presenting, on the display, a portion of the canvas layer, wherein the presented portion of the canvas layer is determined by a size of the display; and
transforming the graphical representation of each of the plurality of DOMs presented on the display into a corresponding DOM of the plurality of DOMs,
wherein prior to generating the canvas layer, a plurality of types of DOMs are received and a graphical representation is generated for each of the plurality of types of DOMs.

15. A method for presenting board graphics, the method comprising:
receiving a request to present, on a display, a board having a plurality of document object models (DOMs) arranged in rows and columns;
generating a canvas layer of the board, wherein the canvas layer includes a graphical representation of each of the plurality of DOMs;
generating a library of locations on the canvas layer, wherein the library of locations stores an arrangement of the plurality of DOMs;
presenting, on the display, a portion of the canvas layer, wherein the presented portion of the canvas layer is determined by a size of the display; and
transforming the graphical representation of each of the plurality of DOMs presented on the display into a corresponding DOM of the plurality of DOMs,
wherein the transforming occurs after presenting the portion of the canvas layer for a time period,
wherein the time period is determined based on an event that precedes receiving the request to present,
wherein the event that precedes receiving the request to present is a scrolling action by a user, and
wherein the scrolling action includes a rate of scroll, and wherein the time period is determined based on the rate of scroll.

16. A system for presenting board graphics, the system comprising:
at least one processor configured to:
receive a request to present, on a display, a board having a plurality of document object models (DOMs) arranged in rows and columns;

generate a canvas layer of the board, wherein the canvas layer includes a graphical representation of each of the plurality of DOMs;

generate a library of locations on the canvas layer, wherein the library of locations stores an arrangement of the plurality of DOMs;

present, on the display, a portion of the canvas layer, wherein the presented portion of the canvas layer is determined by a size of the display; and transform the graphical representation of each of the plurality of DOMs presented on the display into a corresponding DOM of the plurality of DOMs, wherein the transforming occurs after presenting the portion of the canvas layer for a time period, wherein the time period is determined based on an event that precedes receiving the request to present, wherein the event that precedes receiving the request to present is a scrolling action by a user, and wherein the scrolling action includes a rate of scroll, and wherein the time period is determined based on the rate of scroll.

17. A method for presenting board graphics, the method comprising:

receiving a request to present, on a display, a board having a plurality of document object models (DOMs) arranged in rows and columns;

generating a canvas layer of the board, wherein the canvas layer includes a graphical representation of each of the plurality of DOMs;

generating a library of locations on the canvas layer, wherein the library of locations stores an arrangement of the plurality of DOMs;

presenting, on the display, a portion of the canvas layer, wherein the presented portion of the canvas layer is determined by a size of the display; and transforming the graphical representation of each of the plurality of DOMs presented on the display into a corresponding DOM of the plurality of DOMs, the transforming further comprising:

determining a transformation ratio for the plurality of DOMs presented on the display; and based on the determined transformation ratio, transforming the graphical representation of each of the plurality of DOMs presented on the display into a corresponding DOM of the plurality of DOMs, wherein the transforming occurs at a rate that corresponds with a refresh rate of the display.

18. A method for presenting board graphics, the method comprising:

receiving a request to present, on a display, a board having a plurality of document object models (DOMs) arranged in rows and columns;

generating a canvas layer of the board, wherein the canvas layer includes a graphical representation of each of the plurality of DOMs;

generating a library of locations on the canvas layer, wherein the library of locations stores an arrangement of the plurality of DOMs;

presenting, on the display, a portion of the canvas layer, wherein the presented portion of the canvas layer is determined by a size of the display; and transforming the graphical representation of each of the plurality of DOMs presented on the display into a corresponding DOM of the plurality of DOMs, wherein the request to present includes a desired time frame, wherein the transforming occurs at a rate that corresponds with a refresh rate of the display, and wherein the transforming stops after a second desired time within the desired time frame has elapsed.

19. A method for presenting board graphics, the method comprising:

receiving a request to present, on a display, a board having a plurality of document object models (DOMs) arranged in rows and columns;

determining, for each of the plurality of types of DOMs, a duration of time required to generate a corresponding graphical representation of each of the plurality of types of DOMs;

comparing each of the determined durations of time to a desired duration of time;

identifying one or more of the plurality of types of DOMs based on the comparing, wherein the determined duration of time of the identified one or more of the plurality of types of DOMs is greater than the desired duration of time;

generating a canvas layer of the board, wherein the canvas layer includes a graphical representation of each of the plurality of DOMs;

generating a blank cell as the graphical representation for the identified one or more of the plurality of types of DOMs;

generating a library of locations on the canvas layer, wherein the library of locations stores an arrangement of the plurality of DOMs;

presenting, on the display, a portion of the canvas layer, wherein the presented portion of the canvas layer is determined by a size of the display;

transforming the graphical representation of each of the plurality of DOMs presented on the display into a corresponding DOM of the plurality of DOMs, wherein prior to generating the canvas layer, a plurality of types of DOMs are received and a graphical representation is generated for each of the plurality of types of DOMs.

20. A system for presenting board graphics, the system comprising:

at least one processor configured to:

receive a request to present, on a display, a board having a plurality of document object models (DOMs) arranged in rows and columns;

generate a canvas layer of the board, wherein the canvas layer includes a graphical representation of each of the plurality of DOMs;

generate a library of locations on the canvas layer, wherein the library of locations stores an arrangement of the plurality of DOMs;

present, on the display, a portion of the canvas layer, wherein the presented portion of the canvas layer is determined by a size of the display; and transform the graphical representation of each of the plurality of DOMs presented on the display into a corresponding DOM of the plurality of DOMs, the transforming further comprising:

determining a transformation ratio for the plurality of DOMs presented on the display; and based on the determined transformation ratio, transforming the graphical representation of each of the plurality of DOMs presented on the display into a corresponding DOM of the plurality of DOMs, wherein the transforming occurs at a rate that corresponds with a refresh rate of the display.

21. A system for presenting board graphics, the system comprising:
at least one processor configured to:
receive a request to present, on a display, a board having a plurality of document object models (DOMs) arranged in rows and columns;
generate a canvas layer of the board, wherein the canvas layer includes a graphical representation of each of the plurality of DOMs;
generate a library of locations on the canvas layer, wherein the library of locations stores an arrangement of the plurality of DOMs;
present, on the display, a portion of the canvas layer, wherein the presented portion of the canvas layer is determined by a size of the display; and
transform the graphical representation of each of the plurality of DOMs presented on the display into a corresponding DOM of the plurality of DOMs,
wherein the request to present includes a desired time frame,
wherein the transforming occurs at a rate that corresponds with a refresh rate of the display, and
wherein the transforming stops after a second desired time within the desired time frame has elapsed.

22. A system for presenting board graphics, the system comprising:
at least one processor configured to:
receive a request to present, on a display, a board having a plurality of document object models (DOMs) arranged in rows and columns;
determine, for each of the plurality of types of DOMs, a duration of time required to generate a corresponding graphical representation of each of the plurality of types of DOMs;
compare each of the determined durations of time to a desired duration of time;
identify one or more of the plurality of types of DOMs based on the comparing, wherein the determined duration of time of the identified one or more of the plurality of types of DOMs is greater than the desired duration of time;
generate a canvas layer of the board, wherein the canvas layer includes a graphical representation of each of the plurality of DOMs;
generate a blank cell as the graphical representation for the identified one or more of the plurality of types of DOMs;
generate a library of locations on the canvas layer, wherein the library of locations stores an arrangement of the plurality of DOMs;
present, on the display, a portion of the canvas layer, wherein the presented portion of the canvas layer is determined by a size of the display;
transform the graphical representation of each of the plurality of DOMs presented on the display into a corresponding DOM of the plurality of DOMs,
wherein prior to generating the canvas layer, a plurality of types of DOMs are received and a graphical representation is generated for each of the plurality of types of DOMs.

* * * * *